US006641740B2

(12) United States Patent
Cornelius et al.

(10) Patent No.: US 6,641,740 B2
(45) Date of Patent: Nov. 4, 2003

(54) METHOD FOR COMBATING HARD WATER AND SCALE BY USING ALGINS

(75) Inventors: Gay Joyce Cornelius, Cottingham (GB); Ian Gordon Jolliffe, Cottingham (GB); Malcolm Tom McKechnie, Lund (GB); Edvar Jarle Onsoyen, Drammen (NO)

(73) Assignee: Reckitt Benckiser (UK) Limited, Slough (GB)

(*) Notice: Subject to any disclaimer, the term of this patent is extended or adjusted under 35 U.S.C. 154(b) by 0 days.

(21) Appl. No.: 10/103,193

(22) Filed: Mar. 21, 2002

(65) Prior Publication Data

US 2003/0062315 A1 Apr. 3, 2003

Related U.S. Application Data

(63) Continuation of application No. PCT/GB00/03599, filed on Sep. 20, 2000.

(30) Foreign Application Priority Data

Sep. 23, 1999 (GB) ............................................. 9922491
Dec. 22, 1999 (GB) ............................................. 9930261
May 26, 2000 (GB) ............................................. 0012847

(51) Int. Cl.$^7$ ................................................. C02F 5/10
(52) U.S. Cl. ........................ 210/698; 134/3; 134/22.14; 134/41; 252/180
(58) Field of Search ............................... 210/698–701; 252/180, 181; 134/2, 3, 22.14, 41

(56) References Cited

U.S. PATENT DOCUMENTS

| 3,483,033 A | 12/1969 | Casey |
| 3,970,594 A | 7/1976 | Claybaugh |
| 4,561,982 A * | 12/1985 | Kuriyama et al. ........... 210/698 |
| 4,585,560 A | 4/1986 | Sikes |
| 4,725,455 A | 2/1988 | Taha |
| 4,891,148 A * | 1/1990 | Ouhadi et al. ............... 510/304 |
| 4,961,871 A | 10/1990 | Michael |
| 4,995,985 A | 2/1991 | Scott et al. |
| 5,424,377 A * | 6/1995 | Shimizu et al. ................ 526/62 |
| 5,520,819 A | 5/1996 | Asahi et al. |
| 5,567,451 A | 10/1996 | Rinn et al. |
| 5,578,217 A | 11/1996 | Unger et al. |
| 5,861,048 A * | 1/1999 | Kamasaka et al. .............. 71/11 |

FOREIGN PATENT DOCUMENTS

| EP | 0 266 779 A2 | 5/1988 |
| EP | 0 380 228 A2 | 8/1990 |
| EP | 0 895 777 A2 | 2/1999 |
| GB | 765351 | 1/1957 |
| GB | 1 249 329 | 10/1971 |
| GB | 1 534 722 | 12/1978 |
| GB | 2 178 753 A | 2/1987 |
| GB | 2 191 781 A | 12/1987 |
| JP | 53001208 B | 1/1978 |
| WO | WO 98/51710 A1 | 11/1998 |

OTHER PUBLICATIONS

Schwartz, et al., *Surface Active Agents and Detergents*, vol. 2, pp. 25–138, Interscience Publishers, Inc. (1958).

* cited by examiner

*Primary Examiner*—Peter A. Hruskoci
(74) *Attorney, Agent, or Firm*—Akin Gump Strauss Hauer & Feld, L.L.P.

(57) ABSTRACT

The deleterious effects of metal ions in water, for example water hardness and formation of deposits, may be combated by application of an algin, for example alginic acid or a salt of alginic acid, such as sodium alginate or potassium alginate. Such a compound may bring about water purification and/or softening and prevent formation of deposits. Furthermore, such a compound may promote the removal of existing deposits, for example scale.

14 Claims, No Drawings

METHOD FOR COMBATING HARD WATER AND SCALE BY USING ALGINS

CROSS-REFERENCE TO RELATED APPLICATIONS

This application is a continuation of International Application No. PCT/GB00/03599, filed Sep. 20, 2000, which was published in the English language on Mar. 29, 2001, under International Publication No. WO 01/21536 A1, and the disclosure of which is incorporated herein by reference.

BACKGROUND OF THE INVENTION

The present invention relates to methods and compositions for sequestering metal ions in solution, and to methods and compositions for combating metal compound deposits. Of particular interest (but not the exclusive interest) is the prevention of the deleterious effects associated with compounds of alkaline earth metals. Calcium salts, for example calcium carbonate, and magnesium salts form particularly prevalent salt deposits commonly known as scale or lime scale, which is troublesome in itself and which provides sites for concentrations of soils and bacterial growth. Calcium and magnesium ions in aqueous solution are responsible for "hard" water, in which it is difficult to form a lather with soap or detergent, and which may then form an unpleasant scum. Of course, it is from hard water that scale forms.

Known calcium ion sequestrants, acting as water softeners, include sodium carbonate, sodium citrate, and phosphates, including sodium acid pyrophosphate, sodium polyphosphate, trisodium phosphate, tetrasodium pyrophosphate and sodium tripolyphosphate. Many such sequestrants have certain limitations on how they can be used, for example within a certain pH range only, some give rise to undesirable effluents, and some are corrosive to metals.

It would be desirable to employ a composition which can act as an effective sequestrant, acting as a water softener, without having one or more of the problems of known sequestrants, as mentioned above.

Known scale removers typically employ mineral acids, for example hydrochloric acid. They must be employed with some care and may represent an environmental hazard, and be corrosive to metals.

It would be desirable to employ a composition which can effectively combat solid metal compound deposits, for example scale, without incurring one or more of the problems of known compounds, as mentioned above.

BRIEF SUMMARY OF THE INVENTION

In accordance with a first aspect of the present invention there is provided a method of combating metal species carried by or deposited from water, the method comprising the delivery to an environment in which the metal species are present of a composition comprising an algin.

The term "combating" may include the treatment of a metal compound already present as a solid deposit, or the treatment of the said environment to prevent or hinder the deposition of such a compound from solution, or both. Thus, the treatment could be one of deposit removal, and/or water purification and/or water softening.

The term "metal species" includes ions in solution and deposits of metal compounds, including metal oxides and, especially, metal salts.

Algins may be found in and isolated from various organisms, in particular from algae belonging to the order Phaeophyceae and soil bacteria such as *Azotobacter vinelandii* and *Azotobacter crococcum* and from several strains of Pseudomonas bacteria. Common algal sources of algins include *Laminaria digitata, Ecklonia maxima, Macrocystis pyrifera, Lessonia nigrescens, Ascophyllum nodosum, Laminaria japonica, Durvillea antartica, Durvillea potatorum* and, especially, *Laminaria hyperborea.*

Alginic acid is a linear hetero-polysaccharide comprising units of β-D-mannuronic acid and α-L-guluronic acid. Alginic acid may comprise homopolymeric sequences of mannuronic acid, homopolymeric sequences of guluronic acid, and mixed sequences of mannuronic acid and guluronic acid units.

Alginic acid itself is effective in the method of the present invention in combating metal species. Salts of alginic acid used in the method of the present invention may include alkali metal salts, for example sodium and potassium salts, and ammonium and alkanolamine salts. Alkali metal salts are of particular interest.

The term "algins" as used herein includes alginic acid and salts of alginic acid, irrespective of the relative proportion of mannuronic and guluronic units, and is intended to include glycolated or alkoxylated derivatives, especially those derivatized with propylene glycol. However, preferred compounds are not alkoxylated or glycolated. Guluronic acid-rich alginic acid and guluronic acid-rich salts of alginic acid are of particular interest. Preferred compounds have at least about 50%, more preferably about 55–99%, most preferably about 60–80% of guluronic units (by weight), the balance being mannuronic units. For guidance on production of algins very high in guluronic units the reader is referred to International Patent Application Publication WO 98/51710.

DETAILED DESCRIPTION OF THE INVENTION

We have found particularly good results, notably in removing metal compound deposits, using methods which employ algins and an acid (by which we mean a non-alginic acid, when said algin is alginic acid). Particularly preferred are methods which employ a salt of alginic acid, preferably an alkali metal alginate, and an acid.

In such compositions said acid could (except when said algin is itself alginic acid) be alginic acid. However good results may be obtained using a salt of alginic acid and an acid which is not alginic acid. Suitably, such an acid is an organic acid, preferably a carboxylic acid, preferably one having a plurality of carboxylic groups, for example citric acid, or gluconic acid. Preferably the algin can dissolve in water before the pH is substantially reduced. Gluconic acid can be produced by cleavage of glucono delta lactone in the presence of water. This takes place slowly and offers the possibility of a dry mix of ingredients, including the algin and glucono delta lactone (or other suitable lactone, splitting in the presence of water to form an acid, preferably once the algin has dissolved). Alternatively, the acid could be a mineral acid, for example hydrochloric acid, preferably present in low concentration, and preferably added after the algin has dissolved. Preferably, a non-alginic acid employed in this invention is substantially odorless.

While an acid could be employed in a method of combating a metal species before or after a salt of alginic acid is employed, preferably both such compounds are used at the same time. To this end, a treatment composition may comprise both such compounds in admixture, preferably in an aqueous composition.

Very good results may be obtained, notably in methods of removing metal salt deposits, when the algin is sodium alginate. Especially preferred, however, is potassium alginate. Potassium alginate appears from our tests to be relatively easy to incorporate in stable solutions and to be highly effective in removal of deposits of metal compounds.

Especially preferred for use in methods of water softening is an alginic acid, preferably as the sole algin present.

Preferably, the pH of an aqueous composition comprising an algin is in a range of about 2–12, preferably about 3–11.

Preferably, the pH of an aqueous composition comprising an algin and an acid is less than about 7, preferably about 2–6, and most preferably about 3–5. Preferably, the pH of the composition is in excess of the pKa value of the algin. As noted above, we have found that formation of a stable solution is most easily achieved when the algin is mixed in (preferably dissolved in) water, which is then acidified by an acid.

On the alkaline side, we have obtained good results at pH values in a range of about 8.5–11, especially about 9–10.5, as would be found in dishwashing machines.

A composition used in the method could be provided in a solid form, for example a powder or granules, which is applied directly to a metal compound deposit to be combated or to a substrate on which the deposit could form, or added to water with which the deposit or a said substrate is in contact, or which otherwise contains deleterious or potentially deleterious metal ions. It could be a tablet to be added to, for example, a cistern of a lavatory. Preferably, however, the composition is provided in a liquid form, preferably as an aqueous composition. The in-use composition will suitably be made by dilution of a concentrate, for example a powder, granules or tablet; or a gel or liquid concentrate, with the algin being provided in a pre-hydrated form.

When alginic acid is employed in an aqueous composition, the aqueous composition suitably comprises at least about 0.001 wt % alginic acid, preferably at least about 0.01 wt %, preferably at least about 0.05 wt %, and most preferably at least about 0.1 wt %. Suitably, it comprises up to about 5 wt % alginic acid, preferably up to about 1 wt %, more preferably up to about 0.5 wt %.

When a salt of alginic acid is employed in an aqueous composition, the aqueous composition suitably comprises at least about 0.001 wt % thereof, preferably at least about 0.01 wt %, more preferably at least about 0.05 wt %, and most preferably at least about 0.1 wt %. Suitably, it comprises up to about 5 wt % thereof, preferably up to about 1 wt %, more preferably up to about 0.5 wt %.

In aqueous compositions which contain an algin and an acid which is not alginic acid the definitions given above apply to the algin, and the acid is preferably present in an amount to provide a composition of pH as required; preferably within the parameters stated above for pH.

In aqueous compositions which contain both alginic acid and a salt of alginic acid the above definitions apply to each such component. Preferably, however, such compositions comprise at least about 0.02 wt % of the alginic acid and the alginic salt in combination, more preferably at least about 0.05 wt %, and most preferably at least about 0.1 wt %. Preferably, the composition comprises up to about 5 wt % of the alginic acid and the alginic salt in combination, more preferably up to about 1 wt %, most preferably up to about 0.5 wt %.

In compositions which contain alginic acid and a salt of alginic acid there is suitably at least about 1 part acid to about 5 parts of the salt, by weight, and preferably at least about 1 part acid to about 3 parts of the salt, by weight. More preferably, there is at least about 2 parts acid to about 3 parts of the salt, by weight, and most preferably at least about 1 part acid to about 1 part salt, by weight. Preferably, there is up to about 10 parts acid to about 1 part of the salt, by weight, and more preferably up to about 5 parts acid to about 1 part of the salt, by weight.

Liquid compositions containing certain (generally higher) concentrations of an algin may need to employ solvating or dispersal agents and/or be pumped to the site of the application. A liquid composition as defined above is preferably a ready-for-use composition, to be applied by a customer to a deposit or to water in contact with a deposit or otherwise delivered to an environment prone to such deposits (for example hard water). In use the concentration of the algin(s) may thus be reduced from the values stated above by water present in the environment of the deposit.

A composition may, in addition to the algin, contain one or more additional components, for example selected from biocides, preservatives, bleaching agents, sanitizing agents, fillers, enzymes, colorants, hydrotropes, surfactants (for example anionic, non-ionic, cationic and amphoteric surfactants compatible with the algin, and of which anionic and non-ionic surfactants are preferred), perfumants and suspending agents, for example gum or starch suspending agents. Especially preferred as a bleaching and/or sanitizing agent is a phthalimido-peroxy carboxylic acid in adduct form with a cyclodextrin, as described in European published patent application EP-A-895777, the contents of which are hereinafter incorporated by reference. A preferred material of this type is β-cyclodextrin complexed with epsilon-phthalimido peroxyhexanoic acid. As an alternative bleaching agent sodium chlorite could be used, when the pH of the composition is such that chlorine dioxide will be released. The sodium chlorite may need to be added from a second compartment whereas the phthalimido-peroxycarboxylic acid/cyclodextrin adduct may be co-formulated with the algin.

A suitable anionic surfactant is an anionic organic surfactant, which is usually employed in a soluble salt form, preferably as an alkali metal salt, especially as a sodium salt. Although other types of anionic detergents may be utilized, such as higher fatty acyl sarcosides, alkyl sulphosuccinates, alkyl ether sulphosuccinates, alkylamide sulphosuccinates, alkyl sulphosuccinates, alkyl sulphoacetates, alkyl phosphates, alkyl ether phosphates, acyl isothionates, N-acyl taurates and acyl lactylates, or conventional "soaps" of fatty acids, the preferred anionic surfactants employed are those which are described as being of a sulphonate or sulphate type. These include linear higher alkylaryl sulphonates (for example alkylbenzene sulphonates), alkyl sulphates, alkyl ether sulphates, alkylamidoether sulphates, alkylarylpolyether sulphates, monoglyceride sulphates, alkyl sulphonates, alkylamido sulphonates, higher fatty alcohol sulphates, higher fatty alcohol polyalkoxylate sulphates, olefin sulphonates, α-methyl ester sulphonates and paraffin sulphonates. An extensive listing of anionic detergents, including such sulph(on)ate surfactants, is given at pages 25 to 138 of the text *Surface Active Agents and Detergents*, Vol. II, by Schwartz, Perry and Berch, Interscience Publishers, Inc. (1958), which is incorporated herein by reference. Usually, the higher alkyl group of such anionic surfactants has 8 to 24 carbon atoms, especially 10 to 20 carbon atoms, preferably 12 to 18 carbon atoms, and the alkoxylate content of such anionic surfactants that are alkoxylated (preferably ethoxylated or ethoxylated/propoxylated) is in the range of 1 to 4 alkoxy groups per mole.

One preferred class of anionic surfactants comprises the alkali metal (preferably sodium) alkyl sulphates, preferably having linear $C_{12-18}$ alkyl groups. Another preferred class of anionic surfactants comprises alkali metal (preferably sodium) alkylaryl sulphonates (especially alkylbenzene sulphonates), preferably having linear $C_{10-13}$ alkyl groups.

A suitable non-ionic surfactant of an algin-containing composition is a condensation product of a higher fatty alcohol or alkyl phenol with a lower alkylene oxide, such as ethylene oxide or a mixture of ethylene oxide and propylene oxide. In such non-ionic surfactants the higher fatty moiety will normally be of 7 to 16 carbon atoms and there will usually be present from 3 to 20, preferably 4 to 15 moles of alkylene oxide per mole of higher fatty alcohol. Another class of non-ionic surfactants that could be used is sorbitan esters of fatty acids having from 10 to 24 carbon atoms, for example sorbitan mono-oleate.

The cleaning composition used in a machine washing method hereof may contain a builder. Suitable builders include water-soluble inorganic salt builders, preferably sodium salts, such as sodium polyphosphates, e.g., sodium tripolyphosphate and sodium pyrophosphate, sodium carbonate, sodium bicarbonate, sodium sesquicarbonate, sodium silicate, sodium disilicate, sodium metasilicate and sodium borate. In addition to the water-soluble inorganic salts, water insoluble builders may also be useful, including the ion exchanging zeolites, such as Zeolite 4A. Organic builders may also be employed. Among suitable organic builders are polyacetal carboxylates, as described in U.S. Pat. No. 4,725,455, and water soluble salts of lower hydroxycarboxylic acids, such as sodium citrate and sodium gluconate.

In certain preventive methods of the invention a liquid composition is a relatively viscous composition, such that it may cling to a substrate which has a vertical or inclined surface.

In certain methods of the invention to combat a deposit already present, a liquid composition may be relatively non-viscous, for example free-running. Such a composition may run off regions of a substrate not bearing a deposit but bind to (for example form a gel with) a deposit on the substrate, even when the surface is vertical or inclined. Thus, it may also have a disclosing function, enabling a user to see when the deposit is present. To facilitate this, it may contain a colorant which contrasts with the substrate (for example sanitary ware). It may alternatively have a cosmetic function, to cling to a deposit and mask it from view. To this end a composition of the invention may contain a colorant to match the color of the substrate. For example, it may contain a white colorant or opacifier, when intended for use on white sanitary ware.

When a colorant is used with a phthalimido-peroxycarboxylic acid/cyclodextrin bleaching/sanitizing agent as described above, we have found that the composition retains its color prior to use. When applied to a deposit in an aqueous environment it clings, with the algin, to the scale, which is therefore disclosed by the color. However, color is gradually lost, as scale is removed. Thus, we conclude that bound to the deposit is a complex comprising the algin (or its anions), the colorant and the bleaching agent.

The invention may be used in a domestic or industrial environment.

The method of the invention may be applied to water softening and/or purifying, for example in drinking water filters, washing machines for fabrics, dishwashing machines, kettles, irons and boilers; to cosmetics; and to cleaning products, for example teeth and denture cleaners, bathroom tile and shower screen cleaners, window cleaners, car cleaners, lavatory cleaners, dish- and fabric-washing powders and liquids, soaps, detergents, and shampoos. An advantage of the present invention is that the compositions can be non-corrosive to metals, unlike certain compositions used heretofore.

In the application of one aspect of the method a deposit which is combated is typically already carried as a surface deposit on a substrate, for example a ceramic item such as a sanitary ware product, or a metallic item such as a pipe, kettle, iron, boiler or heater element.

In other applications the method could be applied to the treatment of existing deposits and/or the prevention of deposits in oilfield or oil processing environments, for example in pumping equipment and pipelines.

In other applications the method could be applied in the purification of water to yield improved drinking water.

In the application of another aspect of the method it is a machine washing process, preferably of fabrics, and the composition softens the washing water and prevents deposition of scale or other metal compounds, by sequestering metal ions from the wash water. Suitably, the composition is added at the start of the wash cycle. While, like the known sequestrants mentioned above, it may be formulated to be washed away, in a preferred method it is present throughout the washing operation, including the rinse cycle. This can be achieved by providing the composition within a water-permeable container, such that the algin, and the complex it forms when it captures the metal ions, is unable to pass through the walls of the water-permeable container. The container could be a rigid item with microporous openings in its wall(s), but it is preferably a bag (by which we include a pouch or sachet). The bag may suitably have textile, paper or polymeric walls. Polymeric walls may be of a membrane formed by extrusion or film casting, and have micropores. Walls of non-woven fibrous materials are particularly suitable.

Water-porous containers containing an algin represent a second aspect of the present invention. Thus, in accordance with a second aspect of the invention there is provided a container containing an algin, the container being permeable to water but impermeable to alginic species.

In other applications the method of the invention may be applied as part of a manual cleaning method. The algin is preferably added to washing water at or before the start of cleaning. Preferably, it remains within the washing water throughout the cleaning method. During the cleaning method it may suitably be retained in a container of the type described above. By capturing metal ions, particularly calcium ions, any cleaning agent present in the water is able to work more effectively, and/or surfaces in contact with the washing water are soiled less, whether by encrustations or by water marks ("spotting") left when droplets on the surfaces evaporate. For example, an algin can be used in a bath to soften the bath water, improve lathering and reduce scum formation and settlement on the bath; or in the water used for cleaning windows or washing a car to soften the wash water and reduce "spotting."

A method of the invention is suitably carried out at a temperature in a range of about 5 to about 100° C., especially about 10 to about 60° C. Scale removal variants of the invention are preferably carried out at a temperature of about 10 to about 30° C., more preferably about 15 to about 30° C., and most conveniently at ambient temperature. Water softening variants of the invention are preferably carried out at a temperature of about 10 to about 100° C., or higher under applied pressure; but preferably about 20 to about 60° C.

A deposit or substrate on which a deposit may form is suitably subjected to the algin in an aqueous medium for a soak period, preferably at least about 1 minute, preferably at least about 5 minutes, more preferably at least about 10 minutes, still more preferably at least about 15 minutes, yet more preferably at least about 1 hour, and most preferably for at least about 6 hours; and commonly overnight in many practical situations. However, we have found good results in experiments which treated deposits with an algin for 1 and 10 minutes, and for times in between.

In accordance with a third aspect of the present invention there is provided a method of treating a deposit of a metal compound, the method comprising the application to the deposit of a composition comprising an algin.

In accordance with a fourth aspect of the present invention there is provided a method of preventing the deposition of a metal compound from an aqueous environment, the method comprising the inclusion in the aqueous environment of a composition comprising an algin.

In accordance with a fifth aspect of the present invention there is provided a method of purifying and/or softening water, the method comprising the inclusion in the water of a composition comprising an algin.

The composition used is preferably such that it does not corrode or otherwise degrade metallic, plastic or ceramic surfaces.

The species combated may be ions and/or compounds of lead, copper or iron, or of alkaline earth metals, notably of strontium, barium, magnesium and, especially, calcium. Barium salt deposition is a significant problem in oilfield engineering, and magnesium and, especially, calcium salt deposition is a significant problem in situations in which hard water is employed. Copper and iron compounds may form unsightly deposits and lead species in water are detrimental to health. Most preferably, the methods of the invention are effective in combating calcium species.

In accordance with a sixth aspect of the invention there is provided an aqueous composition comprising an acid and a salt of alginic acid. Such a composition is preferably as defined above. The acid may be alginic acid. Preferably, the acid is an organic acid which is not alginic acid, for example citric acid. Preferably, the pH of the composition is as defined above.

In accordance with a seventh aspect of the present invention there is provided an aqueous composition comprising an algin, the composition being alkaline; its pH preferably being in a range of about 8.5–11.

EXAMPLES

The invention will now be illustrated by reference to the following specific, non-limiting examples.

Example Set 1

A synthetic scaling water was prepared using deionized water dosed with 300 ppm $Ca^{2+}$. This was prepared by adding 504 mg of sodium bicarbonate to 1 liter of deionized water and stirring until dissolved; adding 440 mg of calcium chloride ($CaCl_2.2H_2O$) and stirring until dissolved; and measuring pH and adjusting to pH 7.5 using sodium hydroxide or hydrochloric acid, as required.

Pre-weighed glass microscope slides were placed in the water, and the solution was allowed to evaporate on a hot plate. The temperature of the water was maintained at 50° C., forming a layer of calcium carbonate scale on the slides. The scaled slides were then re-weighed to determine the weight of scale.

Compositions of the algins PROTANAL LF 10/60™ and PROTACID F120™ were prepared in 1 liter batches using triple-distilled, deionized water. The water was placed in a beaker on a magnetic stirrer, and the correct mass of algin added to the vortex. The solution was covered with PARAFILM™ and allowed to mix rapidly until either the algin was dissolved or dispersed. This took anything from 10 minutes to overnight, with the more concentrated compositions generally requiring longer.

PROTANAL LF 10/60™ is highly refined sodium alginate derived from brown seaweed, typically made up of 65–75% guluronic units and 35–25% mannuronic units, and available from FMC Biopolymer of Drammen, Norway. The pH of PROTANAL LF 10/60™ is 6.0–8.0 in 1 wt % aqueous composition and its viscosity is 20–70 mPa.s in 1 wt % aqueous composition.

PROTACID F120™ is a highly refined alginic acid derived from brown seaweed, typically made up of 65–75% guluronic units and 35–25% mannuronic units, and available from FMC Biopolymer. The pH of PROTACID F120™ is 1.5–3.5 in 3 wt % aqueous composition, and the acid value is 230 or above.

Solution/dispersion concentrations of algins are given in Table 1 below.

The immersion method involved submersing the slides horizontally in a shallow bath of the algin compositions, then washing with deionized water to remove any algin residue. The tests took place at ambient temperature (about 20° C.). The treatment period for each solution was 24 hours and each test was undertaken in triplicate. The slides were weighed after the treatment, and the percentage of the scale which had been removed was calculated.

The results given in Table 1 show that a combination of the two algins is much more effective at removing scale than an algin used singly at the same or similar concentrations. For example 0.01 wt % PROTACID F 120™, when used singly, removed some scale, but only 2.4–3.7 wt %. The same concentration of 0.01% PROTANAL LF™ 10/60 also removed some scale, but only 0.6–2.4 wt %. In comparison combining these concentrations of each algin resulted in scale reduction of 67–76 wt %.

TABLE 1

| Treatment | Replicate | % Scale removed |
|---|---|---|
| 0.1 wt % PROTANAL LF 10/60 | 1 | 13 |
|  | 2 | 12 |
|  | 3 | 18 |
| 0.01 wt % PROTANAL LF 10/60 ™ | 1 | 1.3 |
|  | 2 | 0.6 |
|  | 3 | 2.4 |
| 0.01 wt % PROTACID F 120 ™ | 1 | 3.2 |
|  | 2 | 3.7 |
|  | 3 | 2.4 |
| 0.1 wt % PROTACID F 120 ™ | 1 | 27 |
|  | 2 | 31 |
|  | 3 | 29 |
| 1.0 wt % PROTACID F 120 ™ | 1 | 60 |
|  | 2 | 58 |
|  | 3 | 69 |
| 0.2 wt % PROTACID F 120 ™ and 0.1 wt % PROTANAL LF 10/60 ™ | 1 | 83 |
|  | 2 | 58 |
|  | 3 | 80 |
| 0.15 wt % PROTACID F 120 ™ and 0.15 wt % PROTANAL LF 10/60 ™ | 1 | 48 |
|  | 2 | 43 |
|  | 3 | 41 |
| 0.01 wt % PROTACID F 120 ™ and 0.01 wt % PROTANAL LF 10/60 ™ | 1 | 68 |
|  | 2 | 76 |
|  | 3 | 67 |

TABLE 1-continued

| Treatment | Replicate | % Scale removed |
|---|---|---|
| 0.15 wt % PROTACID F 120 ™ and 0.1 wt % PROTANAL LF 10/60 ™ | 1 | 75 |
| | 2 | 87 |
| | 3 | 61 |

Example Set 2

Further work was carried out, using the test methods described above, using PROTANAL LF10/60™ and PROTACID F 120™ in combination. However the substrates were glass microscope slides and glass beakers, and each test was carried out either in triplicate, or in duplicate. The compositions are defined by, and the scale removal results given in, Tables 2, 3, 4 and 5 below. The following ranges were tested:

Tables 2 and 4: 0.1 wt % PROTANAL LF 10/60™ with varying concentrations of PROTACID F 120™ (0.05–0.3 wt %)

Tables 3 and 5: 0.2 wt % PROTACID F 120™ with varying concentrations of PROTANAL LF 10/60™ (0.05–0.3 wt %)

TABLE 2

Results of scale removal tests on glass slides with PROTANAL LF 10/60 ™ 0.1 wt % with varying concentrations of PROTACID F 120 ™ (0.05–0.3 wt %)

| PROTACID F 120 ™ wt % (+0.1 wt % PROTANAL LF 10/60 ™) | Replicate | % Scale removed |
|---|---|---|
| 0.05 | 1 | 96 |
| | 2 | 99 |
| | 3 | 96 |
| 0.10 | 1 | 93 |
| | 2 | 96 |
| | 3 | 95 |
| 0.15 | 1 | 94 |
| | 2 | 82 |
| | 3 | 95 |
| 0.20 | 1 | 94 |
| | 2 | 95 |
| | 3 | 98 |
| 0.25 | 1 | 89 |
| | 2 | 94 |
| 0.30 | 1 | 89 |
| | 2 | 88 |
| | 3 | 97 |

TABLE 3

Results of scale removal tests with PROTACID F 120 ™ 0.2 wt % with varying concentrations of PROTANAL LF 10/60 ™ (0.05–0.3 wt %)

| PROTANAL LF 10/60 ™ wt % (+0.2 wt % PROTACID F 120 ™) | Replicate | % Scale removed |
|---|---|---|
| 0.05 | 1 | 93 |
| | 2 | 95 |
| | 3 | 97 |
| 0.10 | 1 | 96 |
| | 2 | 95 |
| | 3 | 92 |
| 0.15 | 1 | 98 |
| | 2 | 99 |
| | 3 | 97 |
| 0.20 | 1 | 95 |
| | 2 | 98 |
| | 3 | 94 |
| 0.25 | 1 | 97 |
| | 2 | 97 |
| 0.30 | 1 | 95 |
| | 2 | 96 |
| | 3 | 97 |

TABLE 4

Results of scale removal tests on beakers with PROTANAL LF 10/60 ™ 0.1 wt % with varying concentrations of PROTACID F 120 ™ (0.05–0.3 wt %)

| PROTACID F 120 ™ wt % (+0.1 wt % PROTANAL LF 10/60 ™) | Replicate | % Scale removed |
|---|---|---|
| 0.05 | 1 | 100 |
| | 2 | 100 |
| 0.10 | 1 | 100 |
| | 2 | 100 |
| 0.15 | 1 | 100 |
| | 2 | 100 |
| 0.20 | 1 | 100 |
| | 2 | 100 |
| 0.25 | 1 | 100 |
| | 2 | 100 |
| 0.30 | 1 | 100 |
| | 2 | 100 |

TABLE 5

Results of scale removal tests on beakers with PROTACID F 120 ™ 0.2 wt % with variations in PROTANAL LF 10/60 ™ (0.05%–0.3 wt %)

| PROTANAL LF 10/60 ™ wt % (+0.2 wt % PROTACID F 120 ™) | Replicate | % Scale removed |
|---|---|---|
| 0.05 | 1 | 98 |
| | 2 | 99 |
| 0.10 | 1 | 100 |
| | 2 | 100 |
| 0.15 | 1 | 100 |
| | 2 | 100 |
| 0.20 | 1 | 100 |
| | 2 | 100 |
| 0.25 | 1 | 100 |
| | 2 | 100 |
| 0.30 | 1 | 98 |
| | 2 | 99 |

Example Set 3

Further work was carried out using a combination of 0.2 wt % PROTANAL LF 10/60TM and 0.2 wt % PROTACID F120™, using methods described above for scaling glass slides and beakers.

The results for scale reduction on glass slides are given in Table 6 below. The results show near complete removal of scale after only 2 minutes of application and total removal after 10 minutes. The results are the mean from at least 5 samples.

TABLE 6

| Time of application, min | % scale removed |
|---|---|
| 2 | 97.8 |
| 5 | 99 |
| 10 | 100 |

Experiments were undertaken to investigate scale removal from 30 beakers using treatment times of 2, 5 and 10 minutes, and the same treatment composition. Complete removal of scale was always achieved irrespective of contact time.

Example Set 4

In this example set pre-weighed glass microscope slides were placed, upright, in beakers of hard water. The water was tap water supplied by the water authority in Hull, UK. Data supplied by the water authority (Yorkshire Water) gives the mean $Ca^{2+}$ concentration as 90 mg/l and the mean $Mg^{2+}$ concentration as 6.2 mg/l. The water was heated to 50° C. and allowed to evaporate to dryness. The scaled slides were then re-weighed to determine the weight of the scale.

A 0.4 wt % solution in water of a low molecular weight potassium alginate PROTANAL KF 200S™ was prepared. PROTANAL KF 200S™ granules were added to water. With stirring at room temperature a clear solution was made in 40 minutes. No gel or deposit was seen. Initially the solution had a pH of 6.71. It was then adjusted to pH 4 using citric acid.

The process was repeated using the sodium comparator, PROTACID LF 200S™. This too gave a clear solution in water within 40 minutes of stirring at room temperature. The pH now was 6.86. Citric acid was then added to adjust the pH of the solution to 4.

Further comparisons were made with PROTACID KF 200S™ at pH 6.71 (no citric acid addition), with PROTACID LF 200S™ at pH 6.86 (no citric acid addition), and with a citric acid solution, at pH 3.65.

PROTACID KF 200S™ is a low molecular weight highly refined potassium alginate derived from brown seaweed, typically made up of 65–75% guluronic units and 25–35% mannuronic units, and available from FMC Biopolymer.

PROTACID LF 200S™ is a low molecular weight highly refined sodium alginate derived from brown seaweed, typically made up of 65–75% guluronic units and 25–35% mannuronic units, and available from FMC Biopolymer.

The immersion method involved submersing the slides in the solutions for 1, 3, 6 or 10 minutes, removing them, rinsing them with distilled water, drying them at 50C overnight, allowing them to cool for at least 4 hours in a dessicator, and re-weighing them. The results are set out in Table 7 below.

TABLE 7

| | % Scale Removal | | | | |
|---|---|---|---|---|---|
| Contact time | 0.4 wt % KF 200S + citric acid pH 4 | 0.4 wt % KF 200S pH 6.71 | citric acid pH 3.65 | 0.4 wt % LF 200S + citric acid pH 4 | 0.4 wt % LF 200S pH 6.86 |
| 1 min | 63.4 | 27.8 | 41.7 | 53.8 | 57.1 |
| 3 min | 84.4 | 23.8 | 57.1 | 68.6 | 66.7 |
| 6 min | 78.9 | 52.6 | 27.3 | 77.1 | 45.8 |
| 10 min | 100.0 | 41.9 | 62.2 | 68.5 | 40.5 |

Example Set 5

A few drops of white opacifier sold by Rohm and Haas under the trademark ROPAQUE™ were added to 10 ml of 0.4 wt % aqueous solution of PROTANAL KF 200S™ adjusted (after dissolution) to pH 4 by citric acid. This formed a very dense white solution. A few drops were added to a calcium carbonate scaled slide. After a few seconds a dense, white gel formed on the scale while the solution tended to run off the unscaled surface.

A little water-soluble blue dye created the same effect on addition to a scaled slide, but with the formation of a dense blue gel. Addition of these materials acted to color the scale while scale removal took place.

Example Set 6

Compositions comprising 0.8 wt % PROTANAL KF 200S™, which had been adjusted (after dissolution) to pH 4 by citric acid, and 0.5 wt % EURECO HC™ were mixed in equal volumes and tested for bleaching and scale removal. Testing of an alginic stock solution took place over several weeks to give an assessment of stability.

EURECO HC™ is believed to comprise Cavamax W7, β-cyclodextrin complexed with an organic peroxy acid, e-phthalimido peroxyhexanoic acid (PAP). The concentration of PAP in the complex is believed to be 22.2 wt %. It is available from Ausimont SpA and is described in European published patent application EP-A-895777.

Bleaching

An unglazed ceramic tile heavily stained with coffee was kept horizontal, and test solution was dropped onto it, at ambient temperature, and held there for 10 minutes. The coffee stain was effectively bleached at the drops. This test was repeated after one, two, three and four weeks, in order to assess the stability of the composition, and in each case effective bleaching took place.

Scale Removal

Scaled slides were prepared, and tested, as in Example Set 1. Contact times allowed were three minutes and ten minutes, and the tests were carried out 1, 2, and 4 weeks after the algin stock solution was prepared.

The results are set out in Table 8 below

TABLE 8

| | % scale removal | | |
|---|---|---|---|
| Contact time | After 1 week | After 2 weeks | After 4 weeks |
| 3 min | 64 | 80 | 74 |
| 10 min | 71 | 100 | 86 |

Example Set 7

Compositions comprising 0.4 wt % PROTANAL KF 200S™ adjusted (after dissolution) to pH 4 with citric acid and 0.1 wt % sodium chlorite, in water, were mixed and tested for bleaching and for germ kill.

Bleaching

An unglazed ceramic tile heavily stained with coffee was dipped into the test solution at ambient temperature, and held there. After 15 seconds the tile had been bleached, removing the stain.

Germ Kill

Samples were tested by mixing equal volumes of 0.8 wt % PROTANAL KF 200S™ and 0.2 wt % sodium chlorite. Taking into account the presence of test conditions and the inoculum, the in-test concentrations of the two components were 0.32 wt % PROTANAL KF 200S™ and 0.08 wt % sodium chlorite.

The test was carried out at a 5 minute contact time using the BS EN 1276 Suspension Test. The number of surviving organisms from the test mixture was enumerated and the reduction in variable counts (ME values) calculated. The results are set out in Table 9 below. The results show the algin/chlorite composition to have some activity against *E. coli*, and excellent activity against Ps. aeruginosa.

TABLE 9

| | Median ME values (log cfu/ml) | |
|---|---|---|
| Contact time | Clean conditions (0.03 wt % BSA) | Dirty conditions (0.3 wt % BSA) |
| *Escherichia coli* | 3.2 | 2.6* |
| *Pseudomonas aeruginosa* | >6.4 | 5.1 |

*Mean ME values taken instead of median.

Example Set 8

In this set of examples an algin was tested for the removal of scale from the heating elements of kettles. New electric kettles were selected with exposed heating elements.

Kettle 1 was boiled 12 times with a fresh solution of 0.4 wt % PROTANAL KF 200S™ alginate adjusted (after dissolution) to pH 4 with citric acid, as described above. A small amount of water-soluble dye was added to the solution in order to track the appearance of any calcium alginate gel. The element was undamaged by the test. Alginate did not stick to the element and no burnt alginate appeared on the element. No damage was found to the plastic filter. No scaling was observed.

Kettle 2 was boiled 28 times with 0.8 wt % PROTANAL KF 200S™ solution adjusted (after dissolution) to pH 4 with citric acid, as described above. No damage or burning was seen on the element. Flakes of dyed blue alginate material were suspended on the plastic filter of the kettle. No scaling was observed.

Kettle 3 was boiled 33 times with hard tap water and then boiled once more with 0.4 wt % alginate solution adjusted (after dissolution) to pH 4 with citric acid, as described above. Discoloration and scale built up on the kettle element after boiling with hard tap water (90 mg/l $Ca^{2+}$ approx.). The single boil with 0.4 wt % alginate solution adjusted (after dissolution) to pH 4 removed the scale. Alginate gel was seen on the element after boiling. The gel slid off the element after rinsing. Alginate gel was also seen on the plastic filter where scale had built up. This scale was also removed by the algin solution. There was no damage to the metal element, plastic filter or body of the kettle.

Example Set 9

In this set of examples the use of algins retained in microporous containers, to soften hard water, was assessed.

1 g of PROTANAL LF 20™ was placed in a 5×5 cm pouch made from extruded polyester film SN 42 available from Smith & Nephew, York, UK, and heat sealed around its edges. PROTANAL LF 20™ is a food grade sodium alginate available from FMC Biopolymer. A 1 wt % aqueous solution thereof at ambient temperature has a viscosity of 155 to 255 mPa.s and a pH of 6.0 to 8.0.

The pouch was placed in 1 liter of Hull tap water, described above. After 45 minutes most of the pale yellow alginate coarse granules had hydrated and became gel-like; the hydrated gel had swollen to distend the pouch; some gel had been extruded through the SN42 membrane. We concluded that calcium sequestration was taking place but that the pouch was too small for the quantity of alginate, and that the holes in the membrane are too large to retain the alginate gel.

Further tests were carried out using ordinary paper tea bag material. Tea bags of square flat form were carefully opened. The tea was discarded and the bags filled with 1 g of test material. They were re-sealed with adhesive. The bags were found in further tests to be highly effective. The further tests were as follows:

Samples:

Control: BRITA™ water filter ion exchange material, used to purify drinking water.

Alginate: PROTANAL LF20™

Alginic acid: PROTACID F120™

In each case 1 g of sample material was sealed in a bag made of tea bag paper, as described above.

Dosage:

1 liter of Hull hard water (90 mg $Ca^{2+}$/liter) was treated with 1 g material in each case.

Water samples were filtered after treatment to remove any free gel.

Sample test jars were rinsed with deionized water prior to sample storage.

Testing methods were as follows.

Controls 1.a. Hull Water Sample—Untreated

Retain in 250 ml glass jar labelled: 1.a.

1.b. Hull Water Sample—Filtered (Whatman No. 4 Filter Paper 15 cm)

Filter sample into jar.

Discard first 250 ml.

Retain second 250 ml in ajar labelled: 1.b.

1.c. Hull Water Sample—Treated 1.c.i. PROTANAL LF20™

Draw 1 liter of tap water and leave on bench for temperature to reach 21° C.

Add 1 bag containing PROTANAL LF20™ to the test water. Use magnetic stirrer.

Leave in contact for 10 minutes.

After 10 minutes contact remove bag.

Label a 250 ml glass jar.

Filter through Whatman No. 4 filter paper (15 cm) into jar.

Discard first 250 ml.

Retain next 250 ml for test in jar labelled: 1.c.i.

1.c.ii. PROTACID F120

Repeat as for 1.c.i.

Store in jar labelled: 1.c.ii.

1.c.iii. BRITA™ Ion Exchange Material

Repeat as for 1.c.i.

Store injar labelled: 1.c.iii.

Effect of pH Changes at 40° C. on Water Treatment Systems

The aim was to replicate the action in a clothes washing machine, on a smaller scale.

2.a. Hull Water at pH 6 and 40° C.

A total of 5 liters of Hull tap water was used.

2.a.i. Treated with PROTANAL LF20™

Measure 2 liters of Hull tap water into a 5 liter beaker (equivalent to wash phase of a washing machine).

Allow temperature to reach 40° C.

Add 5 bags containing PROTANAL LF20™.

Mix for 45 minutes using magnetic stirrer.

Remove bags, discard hot water and add bags to 1 liter of freshly drawn cold tap water (Rinse 1). Do not heat.

Stir as detailed above for 10 minutes.

Filter 250 ml into a labelled glass jar through a Whatman No. 4 filter (label 2.a.i.1).

Discard and retain a second 250 ml in the jar.

Add the bags to a 1 liter freshly drawn water (Rinse 2).

Stir for 10 minutes. Do not heat.

After 10 minutes remove bags and add to a third liter of fresh tap water (Rinse 3).

Filter, discard first 250 ml and retain second 250 ml sample in jar labelled: 2.a.i.2.

Stir the third sample for 10 minutes.

After 10 minutes filter, discard, filter and retain second 250 ml, as before.

Store in a jar labelled 2.a.i.3.

2.a.ii. Treated with PROTACID F120™

Repeat the test procedure detailed in 2.a.i. using 5 bags containing alginic acid. Store samples from the three "rinse" cycles in jars labelled: 2.a.ii.1, 2.a.ii.2 and 2.a.ii.3.

2.a.iii. Treated with BRITA™ Ion Exchange Material

Repeat test procedure detailed in 2.a.i. using 5 bags containing the BRITA™ material.

Store samples from the three "rinse" cycles in jars labelled: 2.a.iii.1, 2.a.iii.2 and 2.a.iii.3.

2.b. Hull Water at pH 9 and 40° C.

2.b.i. Treated with PROTANAL LF20™

Measure 2 liters of Hull tap water into a 5 liter beaker.

Add the same large magnetic stirrer as used in 2.a and maintain a good stir.

Add sufficient IM sodium hydroxide dropwise, using a plastic pipette, to raise the pH to 9.

Raise the temperature to 40° C. with constant stirring.

When this temperature is reached add 5 bags containing PROTANAL LF20™.

Repeat procedure detailed in 2.a.i. after "Mix for 45 minutes using magnetic stirrer."

Store the samples from the three rinse cycles in jars labelled: 2.b.i.1, 2.b.i.2 and 2.b.i.3.

2.b.ii Treated with PROTACID F120™

Measure 2 liters of Hull tap water into a 5 liter beaker.

Add the large magnetic stirrer as used in 2.a and maintain a good stir.

Add sufficient 1M sodium hydroxide dropwise from a plastic pipette to raise the pH to 9.

Raise the temperature to 40° C. with constant stirring.

When this temperature is reached, add 5 bags containing PROTANAL F120™.

Repeat procedure detailed in 2.a.i. after "Mix for 45 minutes using magnetic stirrer."

Store the samples from the three rinse cycles in jars labelled: 2.b.ii.1, 2.b.ii.2 and 2.b.ii.3.

2.b.iii Treated with BRITA™ ion exchange material

Repeat the above procedure with 5 bags containing the BRITA ion exchange material.

Store samples from the three "rinse" cycles in jars labelled: 2.b.iii.1, 2.b.iii.2 and 2.b.iii.3.

Effect of High pH and High Temperature on Water Treatment Systems 3.a. Treated with PROTANAL LF20™

Measure 2 liters of tap water into a 5 liter beaker and add the large magnetic stirrer.

Set to a good stir.

Adjust the pH to pH 11 by adding 1M sodium hydroxide dropwise using a plastic pipette.

Raise temperature to 60° C.

Add 5 bags containing PROTANAL LF20™.

Leave for 90 minutes.

Remove the bags and place in 1 liter cold tap water, with a magnetic stirrer.

Repeat the test procedure as detailed in 2.a.i after "Do not heat."

Store the samples from three "rinses" in jars labelled: 3.a.i, 3.a.ii and 3.a.iii.

3.b. Treated with PROTACID F120™

Repeat the procedure in 3.a. using 5 bags of PROTACID F120™.

Store the samples from three "rinses" in jars labelled: 3.b.i, 3.b.ii and 3.b.iii.

3.c. Treated with BRITA™ Ion Exchange Material

Repeat the procedure in 3.b. using 5 bags of BRITA™ ion exchange material.

Store the samples from three "rinses" in jars labelled: 3.c.i, 3.c.ii and 3.c.iii.

Calcium ion concentrations were measured by Atomic Absorption Spectroscopy (AAS) using a Perkin Elmer Atomic Absorption Spectrometer Model 3300 with Windows Software; and by Inductively Coupled Plasma—Atomic Emission Spectroscopy (ICPAES), using a Perkin Elmer Plasma 40 emission ICP instrument. Both AAS and ICPAES are comparative techniques for which calibration curves have to be set up. In addition a Calcium Ion Selective Electrode supplied by Mettler Toledo was used to measure calcium ion concentration.

The results are shown in Tables 10, 11 and 12 below. The calcium concentrations measured vary according to the test employed. The effect of the sequestrant on the test methods is not known. However certain trends may clearly be seen, for example the high level of effectiveness of PROTACID F120™ across a wide pH range.

Copper ion levels were also measured by the ICPAES technique and the results are shown in Table 13 below. Again, the trend suggests that the algins, especially PROTACID F120™, can significantly reduce copper ion concentrations.

TABLE 10

AAS results

CALCIUM ion conc., PPM

| | Conditions | Treatment | Ref No | [Conc.] | [Change] | % reduction |
|---|---|---|---|---|---|---|
| Controls* | Hull Tap Water Ambient temp | None | 1.a | 88.7 | | |
| | Hull Tap Water Ambient temp | Filtered through Whatman No 4 | 1.b | 87.5 | | |
| Unadjusted | Temp = 21° C. Contact time 10 min Stirred & filtered | PROTANAL LF20 | 1.c.i | 91.9 | 4.4 | |
| | As above | PROTACID F120 | 1.c.ii | 36.9 | −50.6 | 57.8% |
| | As above | BRITA | 1.c.iii | 90.6 | 2.9 | |
| pH 6 @ 40° C. | Initial 45 min @ 40° C. & pH 6 .Followed by 3 × 10 min tap water rinses. All rinses filtered. | PROTANAL LF20 Rinse 1 Rinse 2 Rinse 3 | 2.a.i.1 2.a.i.2 2.a.i.3 | 91.2 90.6 90.0 | 3.7 3.1 2.5 | |
| | As above | PROTACID F120 Rinse 1 Rinse 2 Rinse 3 | 2.a.ii.1 2.a.ii.2 2.a.ii.3 | 53.1 77.5 74.4 | −34.4 −10.0 −13.1 | 39.3% 11.4% 15.0% |
| | As above | BRITA Rinse 1 Rinse 2 Rinse 3 | 2.a.iii.1 2.a.iii.2 2.a.iii.3 | 80.6 88.1 88.1 | −6.9 0.6 0.6 | 7.8% |
| pH 9 @ 40° C. | Initial 45 min @ 40° C. & pH 9 followed by 3 × 10 min tap water rinses. All rinses filtered. | PROTANAL LF20 Rinse 1 Rinse 2 Rinse 3 | 2.b.i.1 2.b.i.2 2.b.i.3 | 88.1 86.6 82.5 | 0.6 −0.9 −5.0 | 1.0% |
| | As above | PROTACID F120 Rinse 1 Rinse 2 Rinse 3 | 2.b.ii.1 2.b.ii.2 2.b.ii.3 | 65.6 69.4 31.2 | −21.9 −18.1 −56.2 | 25.0% 20.7% 64.3% |
| | As above | BRITA Rinse 1 Rinse 2 Rinse 3 | 2.b.iii.1 2.b.iii.2 2.b.iii.3 | 83.1 86.2 86.9 | −4.4 −1.2 −0.6 | 5.0% 1.4% 0.7% |
| pH 9 @ 60° C. | Initial 90 min @ 60° C. & pH 9 followed by 3 × 10 min tap water rinses. All rinses filtered. | PROTANAL LF20 Rinse 1 Rinse 2 Rinse 3 | 3.a.i 3.a.ii 3.a.iii | 87.5 86.9 86.5 | 0.00 −0.6 −1.0 | 0.7% |
| | As above | PROTACID F120 Rinse 1 Rinse 2 Rinse 3 | 3.b.i 3.b.ii 3.b.iii | 86.5 86.5 83.1 | −1.0 −1.0 −4.4 | 1.1% 1.14 5.0% |
| | As above | BRITA Rinse 1 Rinse 2 Rinse 3 | 3.c.i 3.c.ii 3.c.iii | 64.4 76.9 81.2 | −23.1 −10.6 −6.2 | 26.4% 12.1% 7.1% |

*All changes in ion concentrations calculated from this constant.

TABLE 11

ICPAES results on calcium

CALCIUM ion conc. (PPM)

| | Conditions | Treatment | Ref No | [Conc.] | [Change] | % reduction |
|---|---|---|---|---|---|---|
| Controls* | Hull Tap Water Ambient Temp | None | 1.a | 129.1 | | |
| | Hull Tap Water Ambient Temp | Filtered thru Whatman No 4 | 1.b | 132.4 | | |
| Unadjusted | Temp = 21° C. Contact time 10 min | PROTANAL LF20 | 1.c.i | 120.8 | −11.6 | 8.8% |

TABLE 11-continued

ICPAES results on calcium

| | | | | CALCIUM ion conc. (PPM) | | |
|---|---|---|---|---|---|---|
| | Conditions | Treatment | Ref No | [Conc.] | [Change] | % reduction |
| | Stirred & filtered As for 1.c.i | PROTACID F120 | 1.c.ii | 83.5 | −48.9 | 36.9% |
| pH 6 @ 40° C. | As for 1.c.i Initial 45 min @ 40° C. & pH 6. | BRITA PROTANAL LF20 | 1.c.iii | 132.8 | 0.4 | |
| | Followed by 3 × 10 min tap water rinses. All rinses filtered | Rinse 1 | 2.a.i.1 | 129.2 | −3.2 | 2.4% |
| | | Rinse 2 | 2.a.i.2 | 125.9 | −6.5 | 4.9% |
| | | Rinse 3 | 2.a.i.3 | 132.2 | −0.2 | 0.1% |
| | As above | PROTACID F120 | | | | |
| | | Rinse 1 | 2.a.ii.1 | 113.3 | −19.1 | 14.4% |
| | | Rinse 2 | 2.a.ii.2 | 129.2 | −3.2 | 2.4% |
| | | Rinse 3 | 2.a.ii.3 | 111.3 | −21.1 | 16.0% |
| | As above | BRITA | | | | |
| | | Rinse 1 | 2.a.iii.1 | 121.6 | −10.8 | 8.1% |
| | | Rinse 2 | 2.a.iii.2 | 128.1 | −4.3 | 3.2% |
| | | Rinse 3 | 2.a.iii.3 | 128.8 | −3.6 | 2.7% |
| pH 9 @ 40° C. | Initial 45 min @ 40° C. & pH 9 followed by 3 × 10 min tap water rinses. All rinses filtered. | PROTANAL LF20 | | | | |
| | | Rinse 1 | 2.b.i.1 | 128.7 | −3.4 | 2.5% |
| | | Rinse 2 | 2.b.i.2 | 130.5 | −1.9 | 1.4% |
| | | Rinse 3 | 2.b.i.3 | 126.4 | −6.0 | 4.5% |
| | As above | PROTACID F120 | | | | |
| | | Rinse 1 | 2.b.ii.1 | 46.6 | −85.7 | 64.8% |
| | | Rinse 2 | 2.b.ii.2 | 114.4 | −18.0 | 13.6% |
| | | Rinse 3 | 2.b.ii.3 | 138.4 | 6.0 | |
| | As above | BRITA | | | | |
| | | Rinse 1 | 2.b.iii.1 | 119.4 | −13.0 | 9.8% |
| | | Rinse 2 | 2.b.iii.2 | 120.5 | −11.9 | 8.9% |
| | | Rinse 3 | 2.b.iii.3 | 126.7 | −5.7 | 4.3% |
| pH 9 @ 60° C. | pH 9 followed by 3 × 10 min tap water rinses. All rinses filtered. | PROTANAL LF20 | | | | |
| | | Rinse 1 | 3.a.i | 121.9 | −10.5 | 7.9% |
| | | Rinse 2 | 3.a.ii | 131.5 | −0.9 | 0.6% |
| | | Rinse 3 | 3.a.iii | 127.1 | −5.3 | 4.0% |
| | As above | PROTACID F120 | | | | |
| | | Rinse 1 | 3.b.i | 116.9 | −15.5 | 11.7% |
| | | Rinse 2 | 3.b.ii | 129.2 | −3.2 | 2.4% |
| | | Rinse 3 | 3.b.iii | 125.8 | −6.6 | 4.9% |
| | As above | BRITA | | | | |
| | | Rinse 1 | 3.c.i | 95.0 | −37.4 | 28.2% |
| | | Rinse 2 | 3.c.ii | 121.4 | −11.0 | 8.3% |
| | | Rinse 3 | 3.c.iii | 130.2 | −2.2 | 1.6% |

*all changes in ion concentration calculated from this constant

TABLE 12

Calcium electrode results

| | | | | CALCIUM Ion Concentration in PPM | | |
|---|---|---|---|---|---|---|
| | Conditions | Treatment | Ref No | (Conc.) | (change) | % reduction |
| Controls* | Hull Tap Water Ambient temp | None | 1.a | 232.0 | | |
| | Hull Tap Water Ambient temp | Filtered thru Whatman No 4 | 1.b | 235.0 | | |
| Unadjusted | Temp 21° C. Contact time 10 min | PROTANAL LF20 | 1.c.i | 225.0 | −10.0 | 4.2% |

TABLE 12-continued

Calcium electrode results

| | | | | CALCIUM Ion Concentration in PPM | | |
|---|---|---|---|---|---|---|
| | Conditions | Treatment | Ref No | (Conc.) | (change) | % reduction |
| | Stirred & filtered As above | PROTACID F120 | 1.c.ii | 67.1 | −167.9 | 71.4% |
| pH 6 @ 40° C. | As above Initial 45 min @ 40° C. & pH 6. | BRITA PROTANAL LF20 | 1.c.iii | 211.0 | −24.0 | 10.2% |
| | Followed by 3 × 10 min tap water rinses. All rinses filtered. | Rinse 1 Rinse 2 Rinse 3 | 2.a.i.1 2.a.i.2 2.a.i.3 | 178.0 184.0 173.0 | −57.0 −51.0 −62.0 | 24.2% 21.7% 26.4% |
| | As above | PROTACID F120 Rinse 1 Rinse 2 Rinse 3 | 2.a.ii.1 2.a.ii.2 2.a.ii.3 | 115.0 167.0 167.0 | −120.0 −68.0 −68.0 | 51.1% 28.9% 28.9% |
| | As above | BRITA Rinse 1 Rinse 2 Rinse 3 | 2.a.iii.1 2.a.iii.2 2.a.iii.3 | 169.0 189.0 199.0 | −66.0 −46.0 −36.0 | 28.1% 19.6% 15.3% |
| | | | | 1b reading = 179 mg/l | | |
| pH 9 @ 40° C. | Initial 45 min @ 40° C. & pH 9 followed by 3 × 10 min tap water rinses. All rinses filtered. | PROTANAL LF 20 Rinse 1 Rinse 2 Rinse 3 | 2.a.i.1 2.b.i.2 2.b.i.3 | 219.0 201.0 192.0 | 57.0 39.0 30.0 | |
| | As above | PROTACID F120 Rinse 1 Rinse 2 Rinse 3 | 2.b.ii.1 2.b.ii.2 2.b.ii.3 | 147.0 145.0 54.4 | −15.0 −17.0 −107.6 | 9.2% 10.5% 66.4% |
| | As above | BRITA Rinse 1 Rinse 2 Rinse 3 | 2.b.iii.1 2.b.iii.2 2.b.iii.3 | 204.0 204.0 198.0 | 42.0 42.0 36.0 | |
| pH 9 @ 60° C. | Initial 90 min @ 60° C. & pH 9 followed by 3 × 10 min tap water rinses. All rinses filtered | PROTANAL LF20 Rinse 1 Rinse 2 Rinse 3 | 3.a.i 3.a.ii 3.a.iii | 207.0 198.0 207.0 | 45.0 36.0 45.0 | |
| | As above | PROTACID F120 Rinse 1 Rinse 2 Rinse 3 | 3.b.i 3.b.ii 3.b.iii | 195.0 182.0 183.0 | 33.0 20.0 21.0 | |
| | As above | BRITA Rinse 1 Rinse 2 Rinse 3 | 3.c.i 3.c.ii 3.c.iii | 110.0 135.0 141.0 | −52.0 −27.0 −21.0 | 32.1% 16.7% 13.09% |

*All changes in ion concentrations calculated from this constant.

TABLE 13

ICPAES results on copper

| | | | | COPPER | | |
|---|---|---|---|---|---|---|
| | Conditions | Treatment | Ref No | [Conc.] | [Change] | % reduction |
| Controls* | Hull Tap Water Ambient Temp | None | 1.a | 0.079 | | |
| | Hull Tap Water Ambient Temp | Filtered thru Whatman No 4 | 1.b | 0.163 | | |
| Unadjusted | Temp = 21° C. Contact time 10 | PROTANAL LF20 | 1.c.i | 1.317 | 1.154 | |

TABLE 13-continued

ICPAES results on copper

| Conditions | Treatment | Ref No | COPPER [Conc.] | [Change] | % reduction |
|---|---|---|---|---|---|
| | min Stirred & filtered As for 1.c.i | PROTACID F120 | 1.c.ii | 0.071 | −0.092 | 56.4% |
| | As for 1.c.i | BRITA | 1.c.iii | 0.244 | 0.081 | |
| pH 6 @ 40° C. | Initial 45 min @ 40° C. & pH 6. Followed by 3 × 10 min tap water rinses. All rinses filtered | PROTANAL LF20 Rinse 1 Rinse 2 Rinse 3 | 2.a.i.1 2.a.i.2 2.a.i.3 | 0.798 0.238 0.329 | 0.635 0.675 0.166 | |
| | As above | PROTACID F120 Rinse 1 Rinse 2 Rinse 3 | 2.a.ii.1 2.a.ii.2 2.a.ii.3 | 0.194 0.307 0.173 | 0.031 0.144 0.010 | |
| | As above | BRITA Rinse 1 Rinse 2 Rinse 3 | 2.a.iii.1 2.a.iii.2 2.a.iii.3 | 0.301 0.432 0.495 | 0.138 0.269 0.332 | |
| pH 9 @ 40° C. | Initial 45 min @ 40° C. & pH 9 followed by 3 × 10 min tap water rinses. All rinses filtered. | PROTANAL LF20 Rinse 1 Rinse 2 Rinse 3 | 2.b.i.1 2.b.i.2 2.b.i.3 | 0.232 0.140 0.311 | 0.069 −0.023 0.148 | 14.1% |
| | As above | PROTACID F120 Rinse 1 Rinse 2 Rinse 3 | 2.b.ii.1 2.b.ii.2 2.b.ii.3 | 0.055 0.126 0.390 | −0.108 −0.037 0.227 | 66.2% 22.7% |
| | As above | BRITA Rinse 1 Rinse 2 Rinse 3 | 2.b.iii.1 2.b.iii.2 2.b.iii.3 | 1.801 0.462 0.268 | 1.638 0.299 1.5 | |
| pH 9 @ 60° C. | pH 9 followed by 3 × 10 min tap water rinses. All rinses filtered. | PROTANAL LF20 Rinse 1 Rinse 2 Rinse 3 | 3.a.i 3.a.ii 3.a.iii | 0.300 0.325 0.166 | 0.137 0.162 0.003 | |
| | As above | PROTACID F120 Rinse 1 Rinse 2 Rinse 3 | 3.b.i 3.b.ii 3.b.iii | 0.171 0.159 0.323 | 0.008 −0.004 0.167 | 2.4% |
| | As above | BRITA Rinse 1 Rinse 2 Rinse 3 | 3.c.i 3.c.ii 3.c.iii | 0.232 0.192 0.231 | 0.069 0.029 0.068 | |

*all changes in ion concentration calculated from this constant

A further test was carried out to assess effectiveness at pH 10.5, the typical pH of the washing medium in part of a washing machine cycle. If the pH of Hull water is raised to 10.5 by the addition of 1M sodium hydroxide dropwise, the solution becomes cloudy at pH 10.5, and a precipitate of insoluble calcium hydroxide falls to the bottom of the container on standing.

1 g samples of sequestrants, contained in bags made from tea bag material, were added to 800 g of Hull tap water, stirred for 2 minutes and then the pH of the solution increased to pH 10.5 by the addition of IM sodium hydroxide, dropwise. The solution was stirred throughout the test to ensure thorough mixing. Any cloudiness or precipitate was noted.

The test was repeated with increasing amounts of sequestrant until no cloudiness or precipitate was seen at pH 10.5. We concluded that sufficient sequestrant had been added initially to react with all the dissolved calcium, leaving none free to precipitate at pH 10.5.

| Results Sequestrant | Mass of sequestrant required to react with all dissolved calcium |
|---|---|
| 1. PROTACID F120 ™ | 1 gm |
| 2. PROTANAL LF20 ™ | 4 gm |
| 3. BRITA ™ ion exchange | 4 gm |

NB: PROTACID F120™ was in the form of a fine powder which issued from the tea bag pores and reacted with calcium when first added to the tap water. This resulted in a cloudy solution before any alkali had been added. After two minutes of initial stirring the solution was filtered through a Bruckner funnel and the clear solution tested as above by addition of 1M sodium hydroxide to pH 10.5.

Example Set 10

Removal of scale using further algins was tested. The tests were as described in Example Set 1 above. The conditions and results are set out in Table 14 below. The algins PROTANAL PS50™ and PROTANAL SF120 RB™ are both food grades of sodium alginate. The viscosity at ambient temperature of a 1 wt % aqueous solution of each is 300 to 600 mPa.s, and such solutions both have a pH of 5.0 to 6.5. PROTANAL KF 200S™ and PROTANAL LF20™ are as mentioned above.

TABLE 14

| Solution | Contact time (min) | % Scale removed |
| --- | --- | --- |
| 0.4 wt % PROTANAL LF20 ™ adjusted (after dissolution) to pH 4.11 with 2 wt % citric acid solution | 1 | 94.4 |
| | 3 | 92.6 |
| | 10 | 84.6 |
| | 3 | 64.5 |
| | 10 | 71.4 |
| 0.4 wt % PROTANAL PS50 ™ adjusted (after dissolution) to pH 4.05 with 2 wt % citric acid solution | 1 | 40.5 |
| | 3 | 31.2 |
| | 10 | 50.0 |
| | 3 | 50.0 |
| | 10 | 45.4 |
| 0.4 wt % PROTANAL SF120RB ™ adjusted (after dissolution) to pH 4.10 with 2 wt % citric acid solution | 1 | 62.5 |
| | 3 | 30.8 |
| | 10 | 55.0 |
| | 3 | 57.6 |
| | 10 | 46.1 |
| 0.4 wt % PROTANAL KF200S ™ adjusted (after dissolution) to pH 4 with 2 wt % citric acid solution | 3 | 76.0 |
| | 10 | 80.8 |
| | 3 | 77.5 |
| | 10 | 79.2 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for removing metal salt deposits from a surface, comprising delivering an aqueous composition comprising an algin and an organic acid to an aqueous environment in which the metal salt deposits are present on the surface, wherein the composition has a pH less than about 7.

2. The method as claimed in claim 1, wherein the algin comprises alginic acid.

3. The method as claimed in claim 1, wherein the algin comprises a salt of alginic acid.

4. The method as claimed in claim 3, wherein the algin comprises an alkali metal alginate.

5. The method as claimed in claim 4, wherein the algin comprises potassium alginate.

6. The method as claimed in claim 1, wherein the composition comprises more than one algin, and the total algin content is up to about 5 wt % of the composition.

7. The method as claimed in claim 1, wherein the acid is not alginic acid.

8. The method as claimed in claim 7, wherein the composition has a pH in a range of about 2 to about 6.

9. The method as claimed in claim 1, wherein the acid comprises citric acid.

10. The method as claimed in claim 1, wherein the composition comprises alginic acid and a salt of alginic acid.

11. The method as claimed in claim 1, wherein the metal salt deposits comprise divalent metal salt species.

12. The method as claimed in claim 11, wherein the divalent metal salt species comprise calcium salt species.

13. The method as claimed in claim 1, wherein the surface comprises a sanitary ware surface.

14. The method as claimed in claim 13, wherein the sanitary ware surface comprises a ceramic.

* * * * *